US009260933B2

(12) United States Patent
Artherholt et al.

(10) Patent No.: US 9,260,933 B2
(45) Date of Patent: Feb. 16, 2016

(54) MODULAR BALL DROP

(71) Applicant: Oil States Energy Services, LLC, Houston, TX (US)

(72) Inventors: Danny Lee Artherholt, Asher, OK (US); Bob McGuire, Meridian, OK (US); Mickey Claxton, Mustang, OK (US)

(73) Assignee: Oil States Energy Services, L.L.C., Houston, TX (US)

(*) Notice: Subject to any disclaimer, the term of this patent is extended or adjusted under 35 U.S.C. 154(b) by 490 days.

(21) Appl. No.: 13/742,043

(22) Filed: Jan. 15, 2013

(65) Prior Publication Data

US 2014/0196883 A1 Jul. 17, 2014

(51) Int. Cl.
 *E21B 33/06* (2006.01)
 *F16K 35/02* (2006.01)
 *E21B 33/068* (2006.01)
 *E21B 43/26* (2006.01)

(52) U.S. Cl.
 CPC ............. *E21B 33/068* (2013.01); *F16K 35/027* (2013.01); *E21B 43/26* (2013.01)

(58) Field of Classification Search
 CPC ....... E21B 33/068; E21B 33/05; E21B 33/16; F16K 35/02; F16K 35/022; F16K 35/025; F16K 35/027
 USPC ................................................ 166/75.15, 386
 See application file for complete search history.

(56) References Cited

U.S. PATENT DOCUMENTS

| 3,445,087 | A  |   | 5/1969  | Priese et al. |
|-----------|----|---|---------|---------------|
| 3,894,718 | A  |   | 7/1975  | Koch et al. |
| 4,099,705 | A  |   | 7/1978  | Runyan |
| 4,231,545 | A  |   | 11/1980 | Nelimarkka |
| 4,317,486 | A  | * | 3/1982  | Harris ................. 166/250.04 |
| 4,460,157 | A  |   | 7/1984  | Marchal |
| 4,467,823 | A  |   | 8/1984  | Shaffer et al. |
| 4,548,384 | A  | * | 10/1985 | Harding ..................... 251/163 |
| 4,577,830 | A  |   | 3/1986  | Winegeart |
| 4,605,202 | A  |   | 8/1986  | Tsuno et al. |
| 4,934,656 | A  |   | 6/1990  | Groves et al. |
| 5,154,395 | A  |   | 10/1992 | Horvei |
| 5,494,256 | A  |   | 2/1996  | Beson |
| 6,253,791 | B1 |   | 7/2001  | Miklo |
| 6,467,500 | B2 |   | 10/2002 | Fridlyand |
| 2011/0232923 | A1 | * | 9/2011 | Barbee et al. .................. 166/386 |

* cited by examiner

*Primary Examiner* — Jennifer H Gay
*Assistant Examiner* — George Gray
(74) *Attorney, Agent, or Firm* — Nelson Mullins Riley & Scarborough, LLP

(57) ABSTRACT

A modular ball drop made up of two or more identical ball drop modules that are vertically stacked in a desired number. Each ball drop module can drop one or more frac balls into a fluid stream being pumped into a well.

17 Claims, 11 Drawing Sheets

MODULAR BALL DROP

FIELD OF THE INVENTION

This invention relates in general to hydrocarbon well stimulation equipment and, in particular, to a modular ball drop that permits a plurality of frac balls to be simultaneously injected into a stimulation fluid stream that is being pumped into a hydrocarbon well.

BACKGROUND OF THE INVENTION

Current methods for completing hydrocarbon wells often involve sequentially pumping fracturing fluids into one or more production zones of a well. In order to improve the efficiency of this process, ball-actuated frac sleeves were invented. The ball-actuated frac sleeve has side ports that block fluid access to a production zone with which it is associated until an appropriately sized frac ball is pumped down from the surface to open the sleeve by landing on a frac ball seat through which the frac ball cannot pass. Consequently, when the stimulation of a zone is completed, a frac ball is dropped or injected into a frac fluid stream being pumped down the well. The frac ball lands on the frac ball seat in the ball-actuated frac sleeve and frac fluid pressure on the frac ball forces the side ports in the frac sleeve to open and provide fluid access to that production zone, while blocking access to the zone that was just completed. If many zones are to be stimulated, a large number of size-graduated frac balls are required to stimulate the entire well without interruption. As understood by those skilled in the art, a diameter of the starting frac ball decreases as the required number of frac balls increases. The use of small diameter frac balls has disadvantages. First, all stimulation fluid must be pumped through the frac ball seat orifices, and each seat is at least marginally smaller in diameter than a diameter of the associated frac ball. If the frac ball seat orifice is very small, the rate at which frac fluid can be pumped into the associated zone is affected. Furthermore, small frac balls are more fragile and more likely to get trapped in casing joints or the like on their way down the well casing.

In order to overcome the first problem, certain ball actuated frac sleeves have two or more small frac ball seats, each having an orifice through which frac fluid can be pumped. This permits higher stimulation fluid throughput, but requires the simultaneous release of multiple frac balls of the same diameter. In order to overcome the second problem, many operators require the injection of two or more frac balls of the same diameter for each frac ball seat when the required frac ball(s) is less than a predetermined diameter. This likewise requires the simultaneous release of multiple frac balls of the same diameter.

Most known ball drops and ball injectors are incapable of, or poorly adapted to, simultaneously drop/inject multiple balls of the same diameter.

There therefore exists a need for a modular ball drop that permits multiple balls of the same diameter to be simultaneously injected into a well.

SUMMARY OF THE INVENTION

It is therefore an object of the invention to provide a modular ball drop that permits multiple balls of the same diameter to be simultaneously injected into a well.

The invention therefore provides a modular ball drop module, having: a tubular body having a central passage; a ball retainer mechanism movable from a ball retention position in which the ball retainer mechanism retains at least one frac ball in the central passage to a ball released position in which the at least one frac ball is released from the central passage; and an actuator stem lock mechanism that automatically locks the ball retainer mechanism in the ball released position when the ball retainer mechanism is moved from the ball retainer position to the ball released position.

The invention further provides a modular ball drop module, having: a top end and a bottom end, the top end including a tubular body having a central passage, the top end adapted to be mounted to another ball drop module or a purge valve; and the bottom end connected to the top end and having a central passage of the same diameter and aligned with the central passage of the top end, the bottom end being adapted to be mounted to any one of: another ball drop module, a frac head and a frac iron; a ball retainer mechanism housed by the tubular body and obstructing the central passage of the tubular body when the ball retainer mechanism is in a ball retention position, the ball retainer mechanism being movable from the ball retention position to a ball released position in which the central passage is unobstructed; and an actuator stem lock mechanism that automatically locks the ball retainer mechanism in the ball released position when the ball retainer mechanism is moved from the ball retainer position to the ball released position.

The invention yet further provides a modular ball drop with at least two ball drop modules, the respective ball drop modules having: a central passage that stores frac balls to be dropped by a ball retainer mechanism of the ball drop module, the ball retainer mechanism comprising a retainer ball that obstructs the central passage in a ball retention position and in a ball released position opens the passage to let the frac balls drop through the central passage of the ball drop module; an actuator stem connected to the ball retainer mechanism, the actuator stem being adapted to rotate the ball retainer mechanism from the ball retention position to the ball released position; and an actuator stem lock mechanism that is constantly urged to lock the actuator stem in the ball released position.

BRIEF DESCRIPTION OF THE DRAWINGS

Having thus generally described the nature of the invention, reference will now be made to the accompanying drawings, in which.

DETAILED DESCRIPTION OF THE PREFERRED EMBODIMENTS

The invention provides a modular ball drop that permits a group of frac balls of the same diameter to be simultaneously injected into a well. Any required number of ball drop modules can be vertically stacked to permit a required number of groups of frac balls to be sequentially injected into the well. The modular ball drop may also be used to inject only one ball at a time, or any combination of single and/or multiple balls, into the well. A positive lock engages when a module is moved from the ball retention to the ball released position to prevent obstruction of subsequent ball drops from the modular ball drop.

Figure 1:
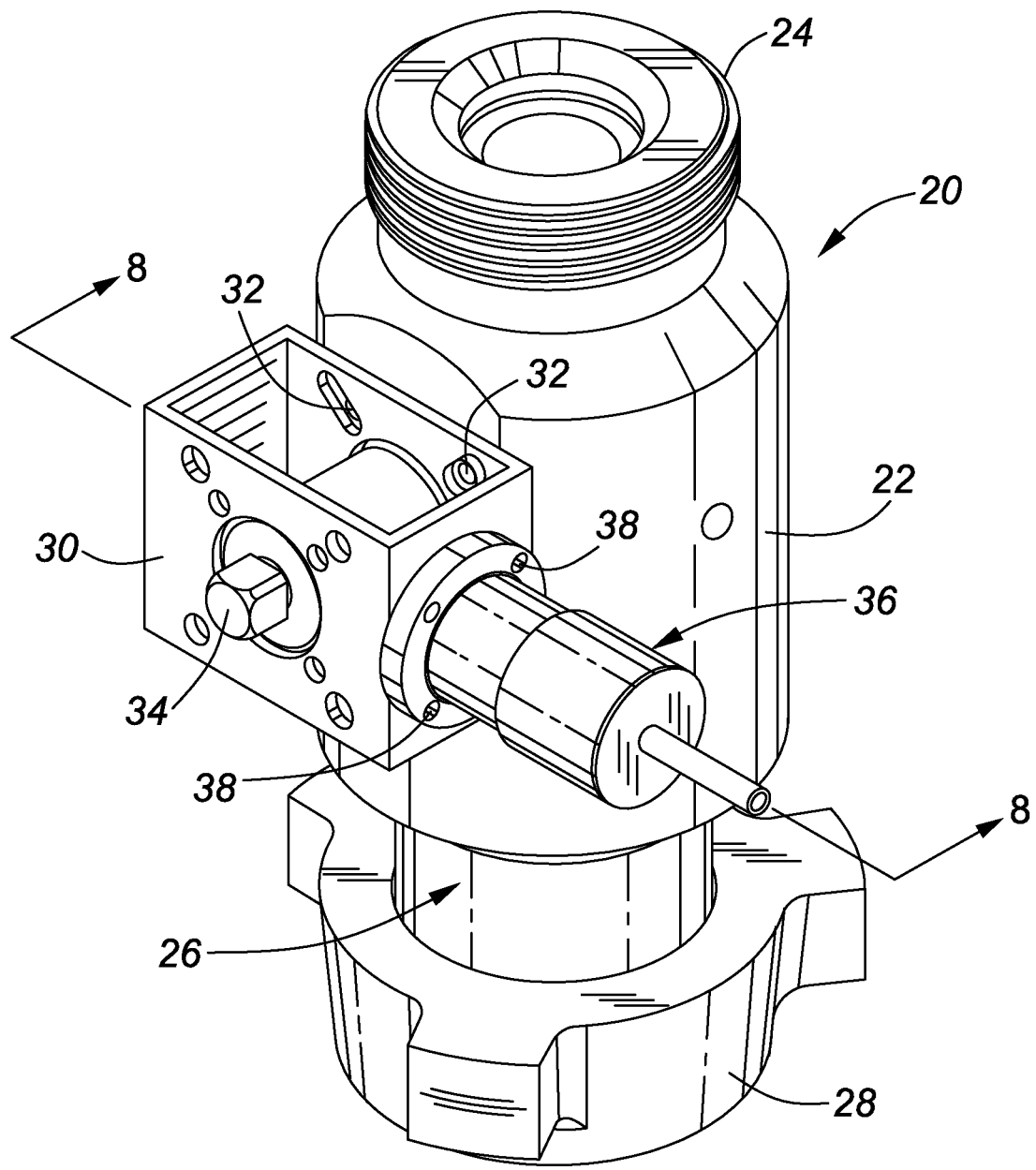
FIG. 1 is an isometric diagram of one embodiment of a ball drop module of the modular ball drop in accordance with the invention.

FIG. 1 is an isometric view of one embodiment of a ball drop module 20 in accordance with the invention. The ball drop module 20, hereinafter referred to as module 20, includes a tubular body 22. This embodiment of the module 20 is provisioned with quick-disconnect threaded unions described in assignee's U.S. Pat. No. 7,484,776 which issued Feb. 3, 2009, the specification of which is incorporated herein by reference. A male component 24 of the threaded union is machined on a top end of the tubular body 22. The male component 24 is used to mount another module 20 or a purge valve to top of the module 20, as will be explained below with reference to FIGS. 10 and 11. A female component 26 of the threaded union is connected to a bottom end of the tubular body 22. The female component 26 supports a hammer nut 28, as explained in the assignee's above-referenced patent. The female component 26 and the hammer nut 28 are used to connect the module 20 to another module 20 as will be explained below with reference to FIG. 10, or to a frac head, a high pressure line or a frac stack, as will be explained below with reference to FIG. 11.

Figure 9:
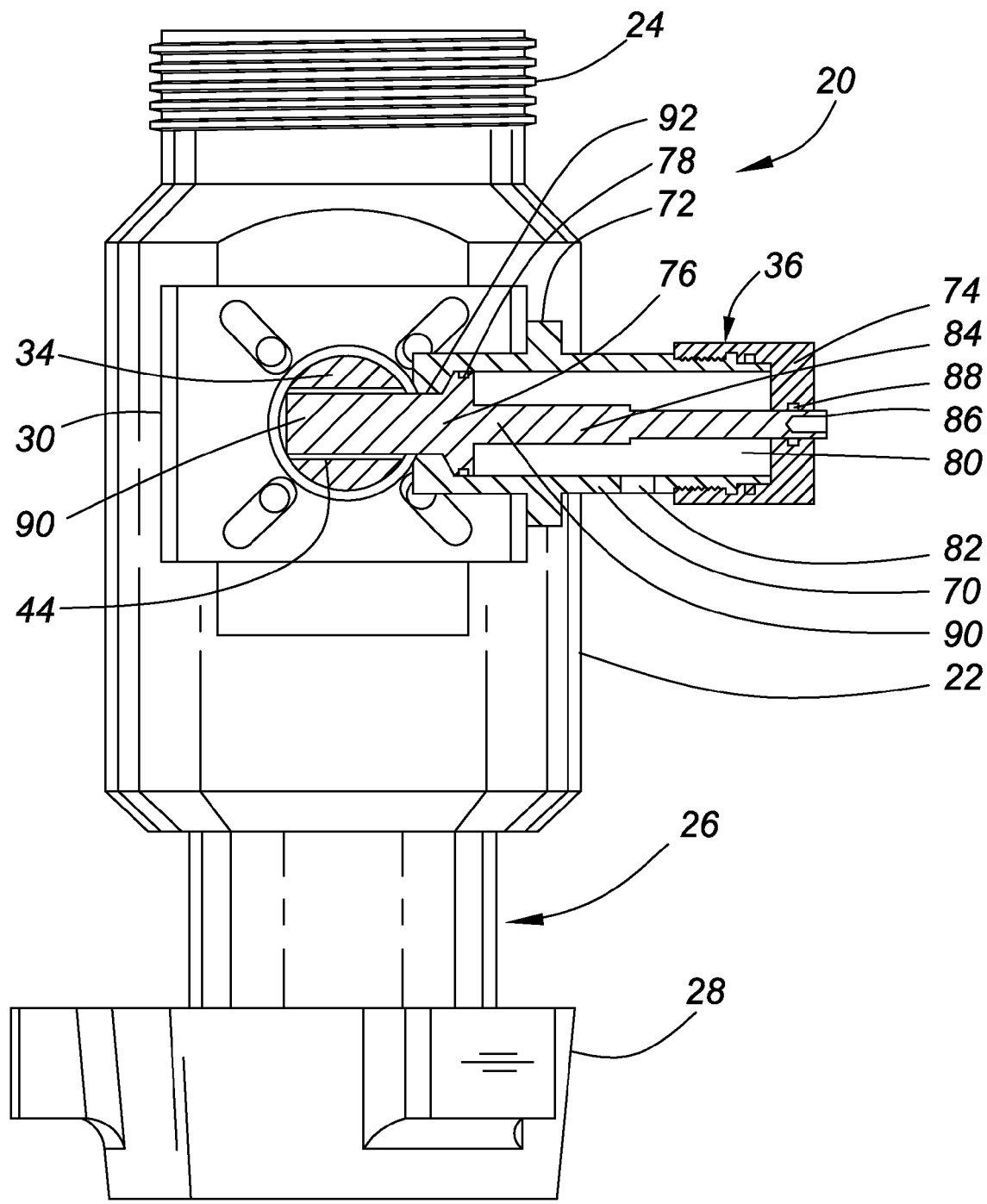
FIG. 9 is a schematic cross-sectional diagram, taken along lines 8-8 shown in FIG. 1, of the ball drop module in the ball released position.
Figure 10:
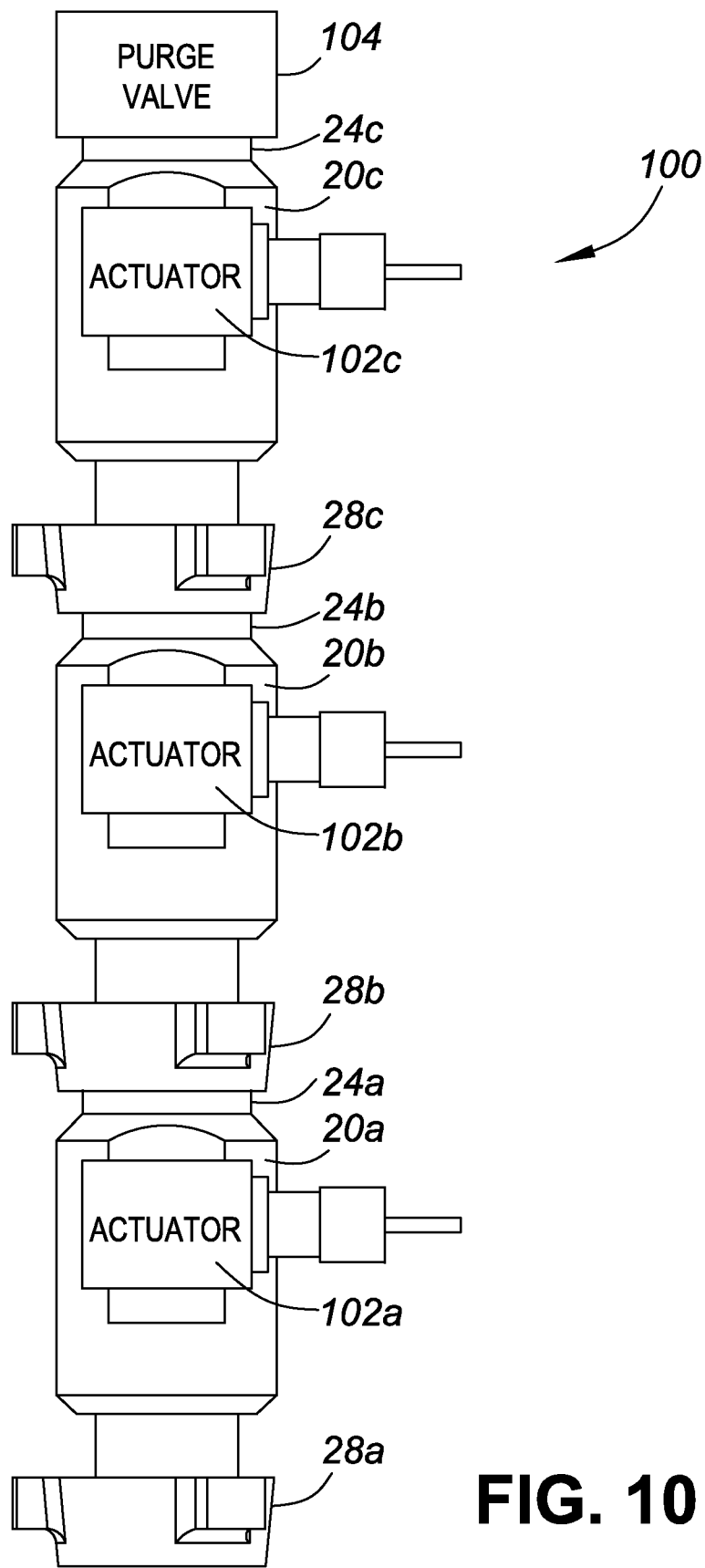
FIG. 10 is a schematic diagram of an exemplary configuration of the modular ball drop in accordance with the invention.
Figure 11:
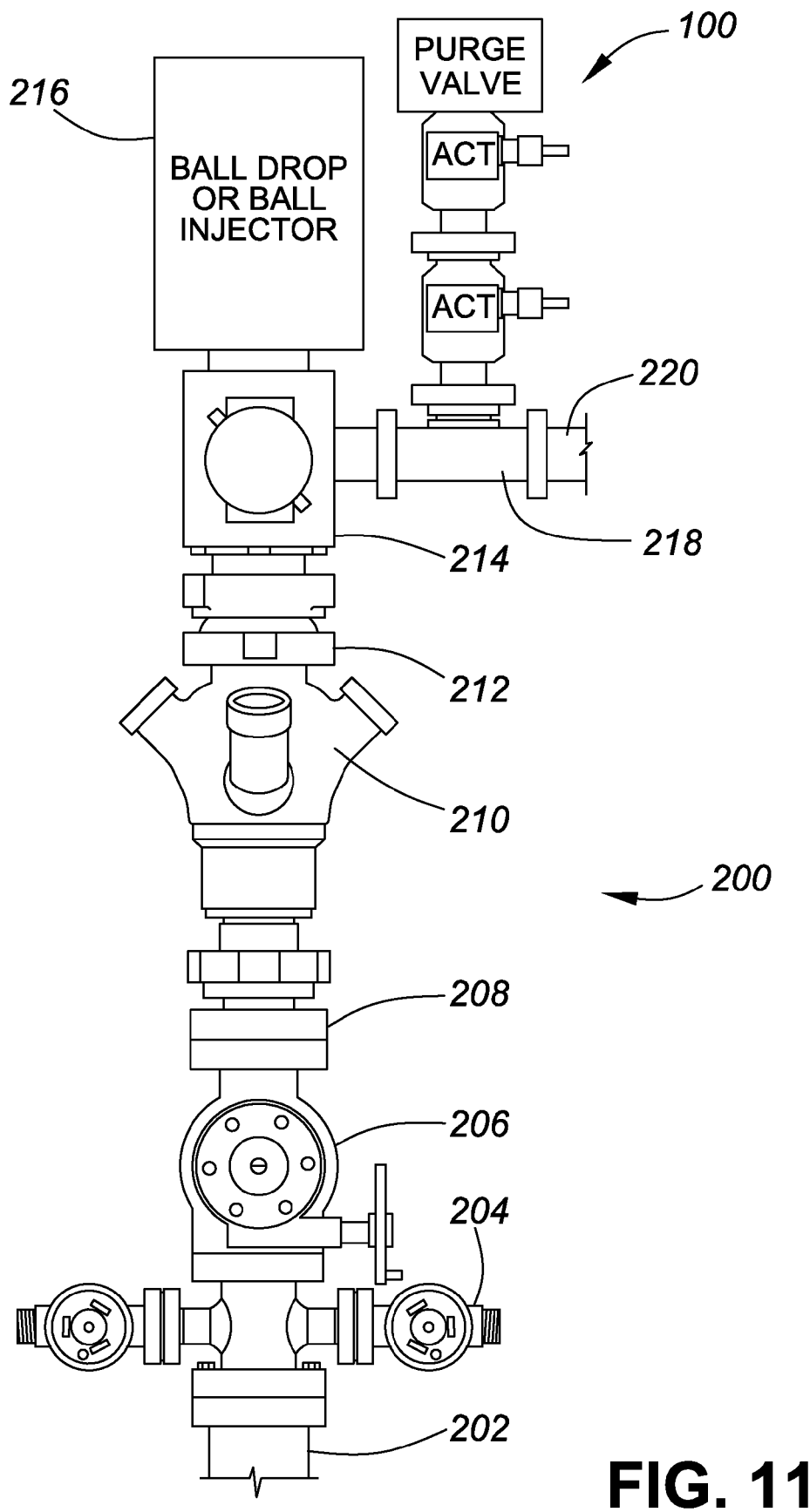
FIG. 11 is a schematic diagram of an exemplary configuration of the modular ball drop in accordance with the invention incorporated in an exemplary frac stack.

In this embodiment, the module 20 is operated using an actuator shown in FIGS. 10 and 11 that is mounted to the tubular body 22 by a mounting bracket 30. The mounting bracket 30 is secured to the tubular body 22 by a plurality of fasteners (not shown) received in threaded bores 32 in the tubular body 22. An actuator stem 34 is connected to a ball retainer mechanism of the module 20, as will be explained below with reference to FIGS. 6 and 7. The actuator stem 34 is turned 90° by the actuator to move the ball retainer mechanism from the ball retention position to the ball released position, as will also be explained below with reference to FIGS. 6 and 7. The mounting bracket 30 also supports an actuator stem lock mechanism 36, which will be explained in detail with reference to FIGS. 8 and 9. The actuator stem lock mechanism 36 is connected to the mounting bracket 30 by a plurality of threaded fasteners 38. The actuator stem lock mechanism 36 automatically locks the actuator stem 34 and the ball retainer mechanism in the ball released position when the actuator moves the ball retainer mechanism to the ball released position. This ensures that the ball retainer mechanism cannot interfere with any subsequent ball drops from other modules, as will be explained below in more detail.

Figure 2:
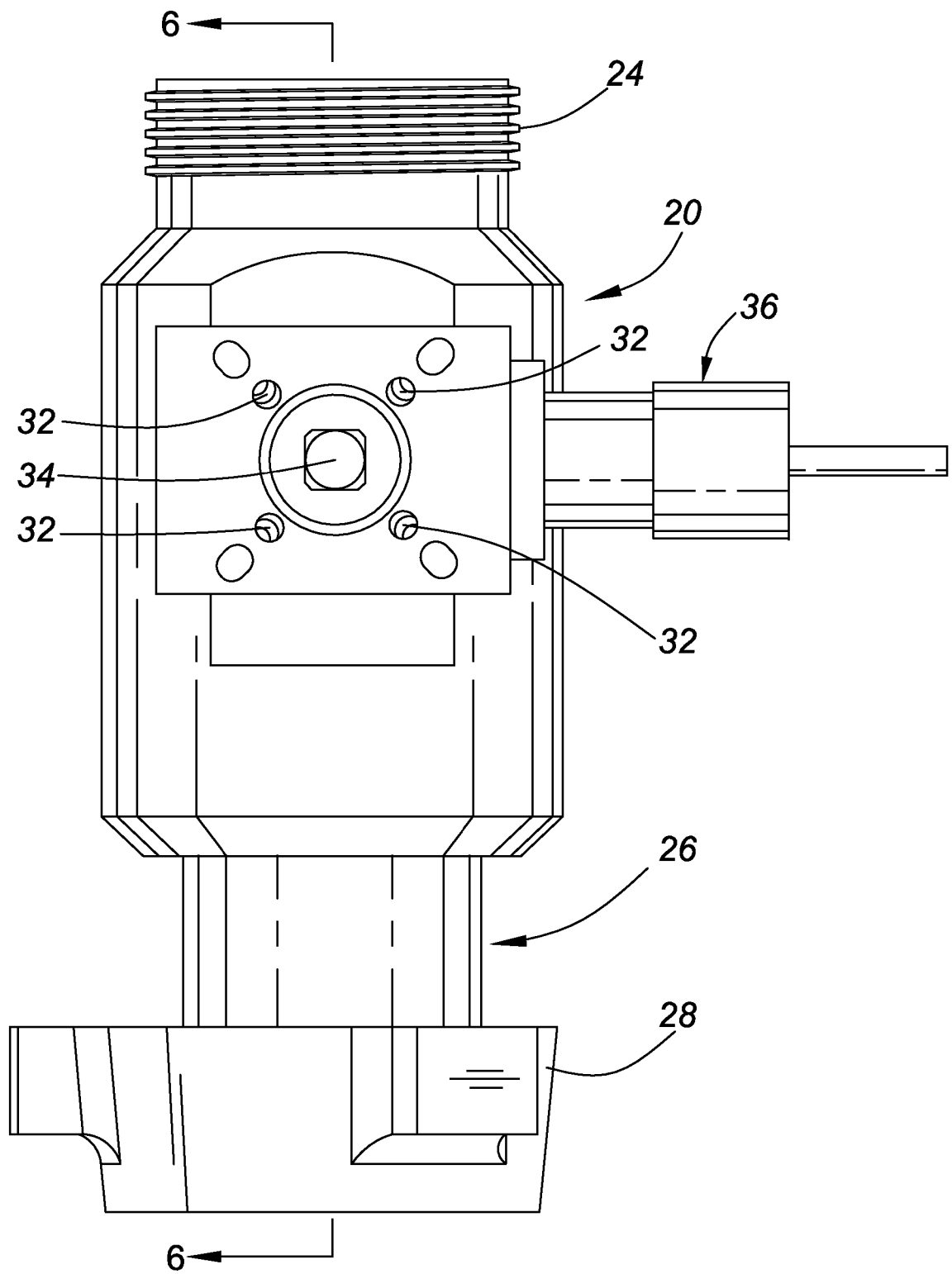
FIG. 2 is a front elevational diagram of the embodiment of the ball drop module shown in FIG. 1.

FIG. 2 is a front elevational diagram of the module 20 shown in FIG. 1.

Figure 3:
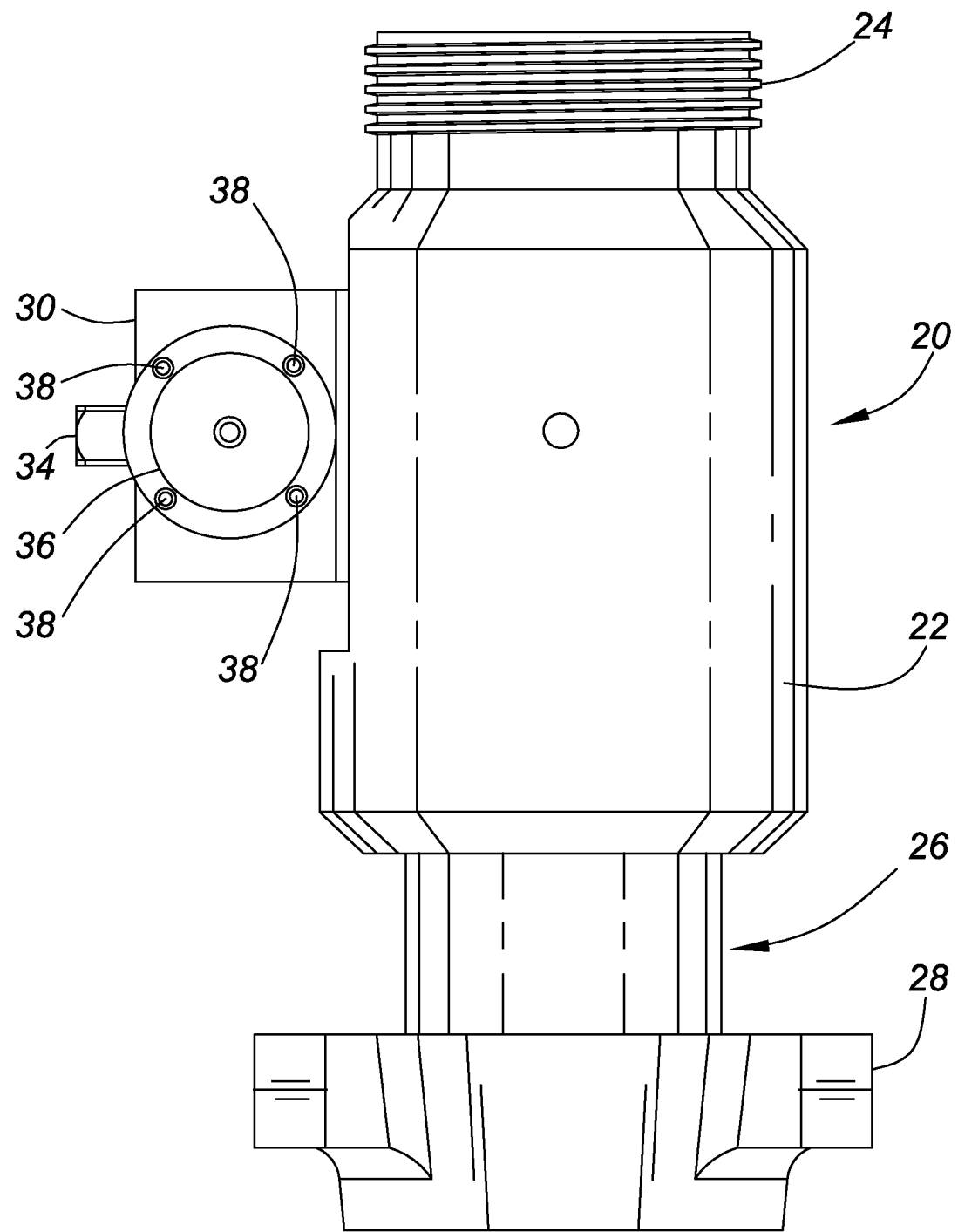
FIG. 3 is right elevational view of the embodiment of the ball drop module shown in FIG. 1.

FIG. 3 is a right side view of the module 20 shown in FIG. 1.

Figure 4:
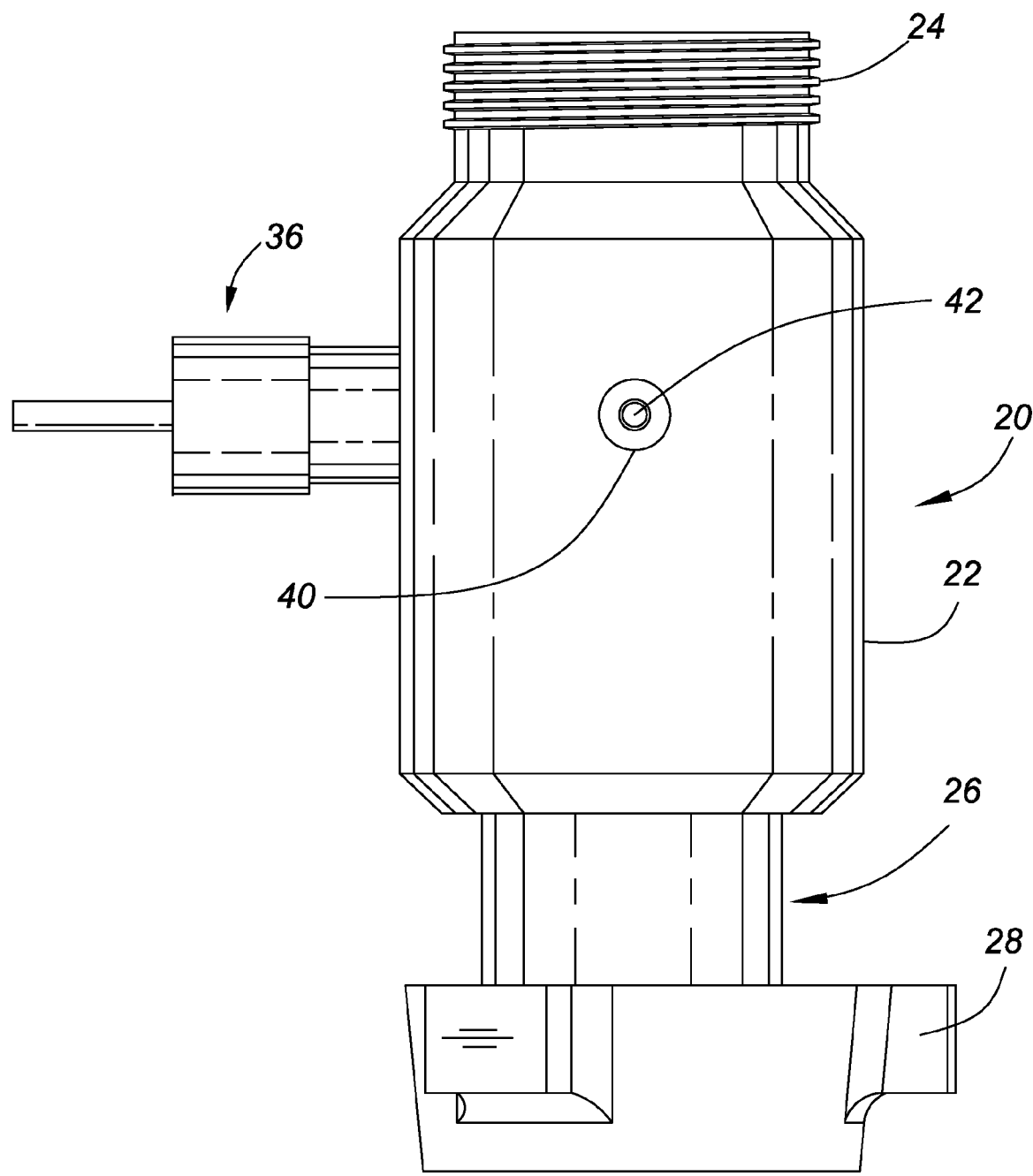
FIG. 4 is a rear elevational diagram of the ball drop module shown in FIG. 1.

FIG. 4 is a rear elevational view of the module 20 shown in FIG. 1. A port 40 in a rear side of the control body supports a pressure balance stem 42 of the ball retainer mechanism, which will be explained below in more detail with reference to FIGS. 6 and 7.

Figure 5:
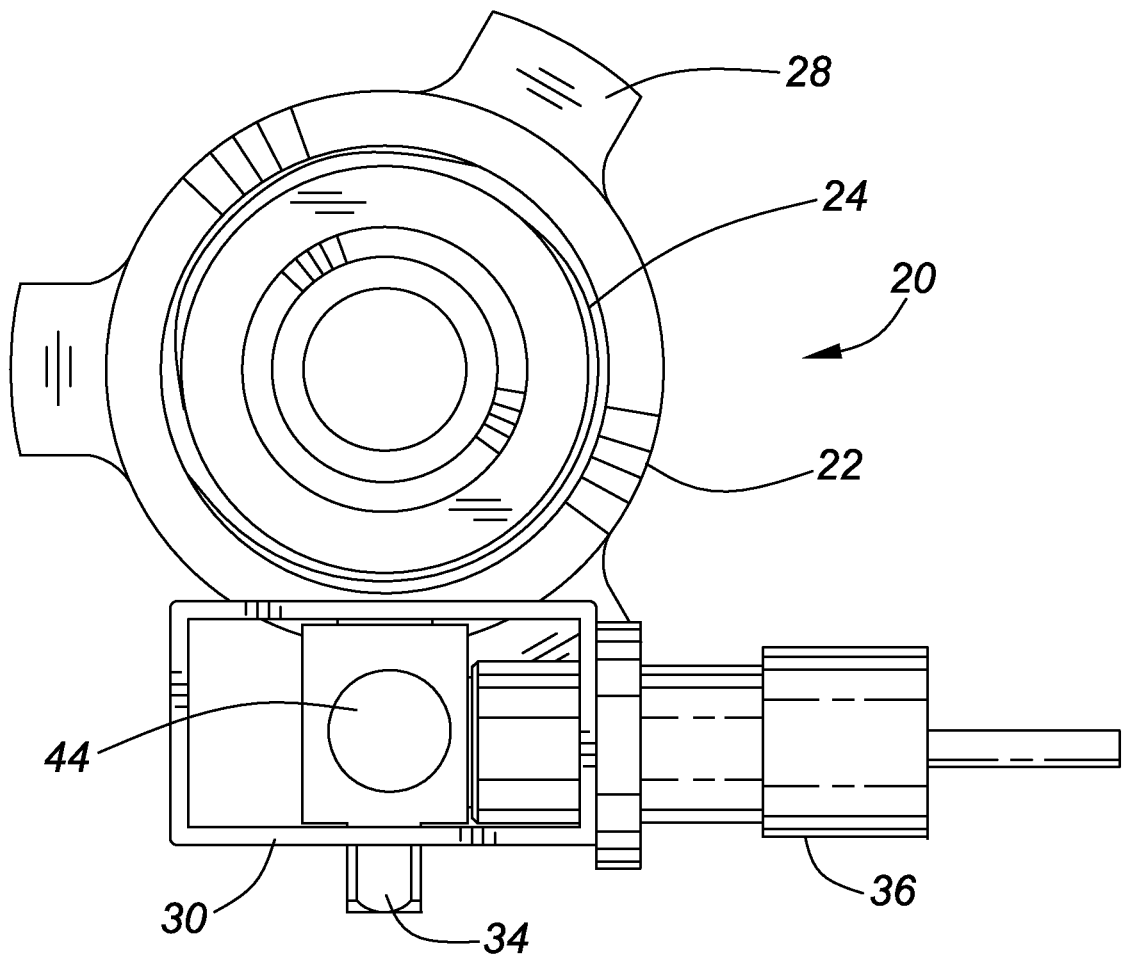
FIG. 5 is a top plan view of the of the ball drop module shown in FIG. 1.

FIG. 5 is a top plan view of the module 20 showing the actuator stem in the ball retention position. A lock bore 44 in the actuator stem 34 receives a lock bolt to lock the actuator stem 34 in the ball released position, as will be explained below with reference to FIGS. 8 and 9.

Figure 6:
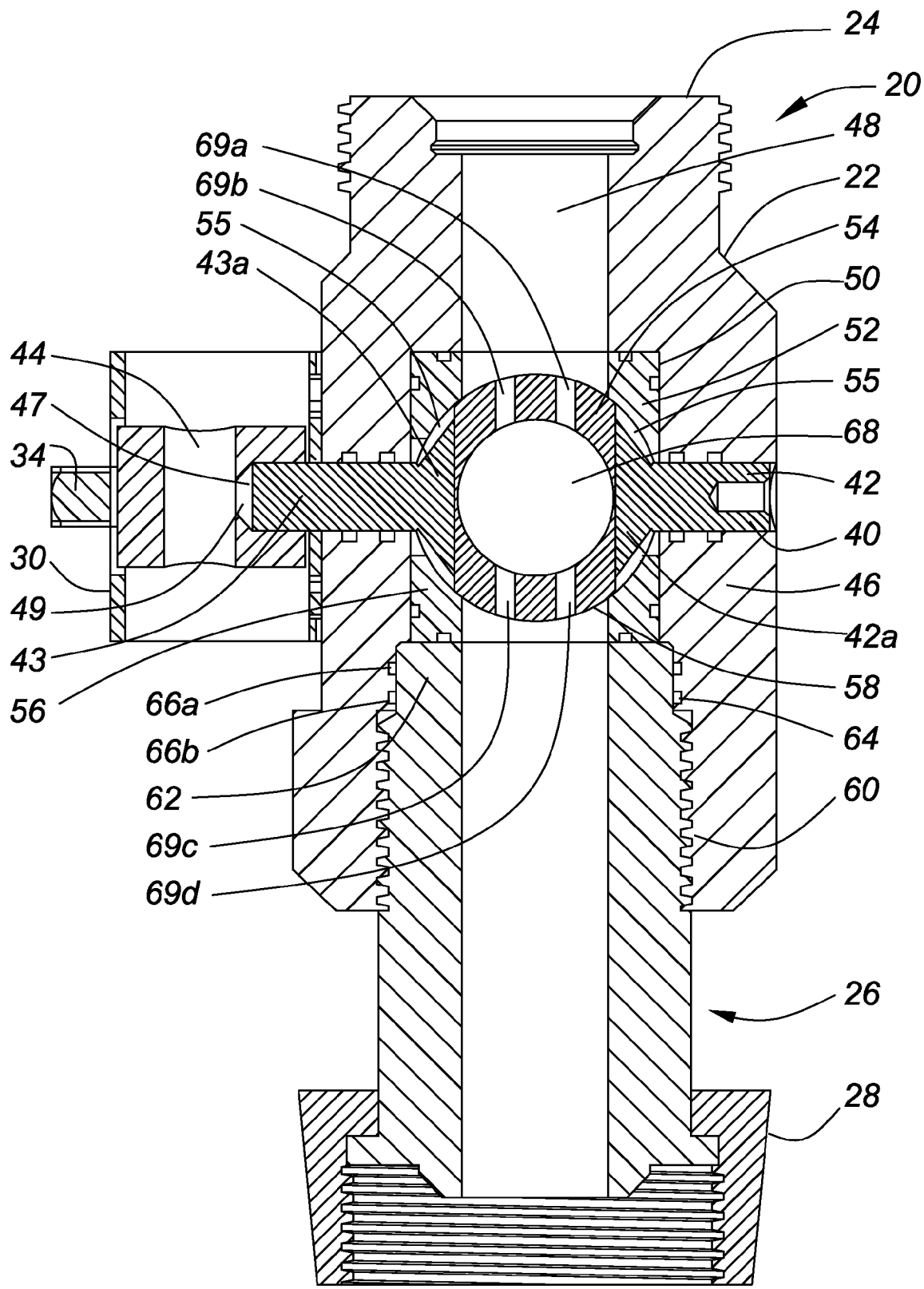
FIG. 6 is a schematic cross-sectional diagram, taken along lines 6-6 shown in FIG. 2, of the ball drop module in a ball retention position.

FIG. 6 is a schematic cross-sectional diagram of the module 20 taken along lines 6-6 shown in FIG. 2 with the ball retainer mechanism 58 in the ball retention position. The tubular body 22 is cylindrical and has a sidewall 46 having a yield strength adequate to withstand frac fluid pressures, e.g. up to at least 15,000 psi. A central passage 48 of the tubular body 22 and the female component 26 is larger than a diameter of a largest frac ball to be dropped into a well. A ball retainer mechanism bore 50 in the tubular body 22 receives a circular upper ball seat 52, a spherical retainer ball 54, and a circular lower ball seat 56 of the ball retainer mechanism 58. The upper ball seat 52, the retainer ball 54, and the lower ball seat 56 are locked in the ball retainer mechanism bore 50 by an inner end 62 of the female component 26, which in this embodiment threadedly engages a box thread 60 in a bottom end of the tubular body 22. The inner end 62 of the female component 26 is received in a seal bore 64 in the bottom end of the tubular body 22. O-ring grooves 66a, 66b in the seal bore 64 respectively retain fluid seals that provide a high pressure fluid seal around the inner end 62 of the female connector 26.

Figure 7:
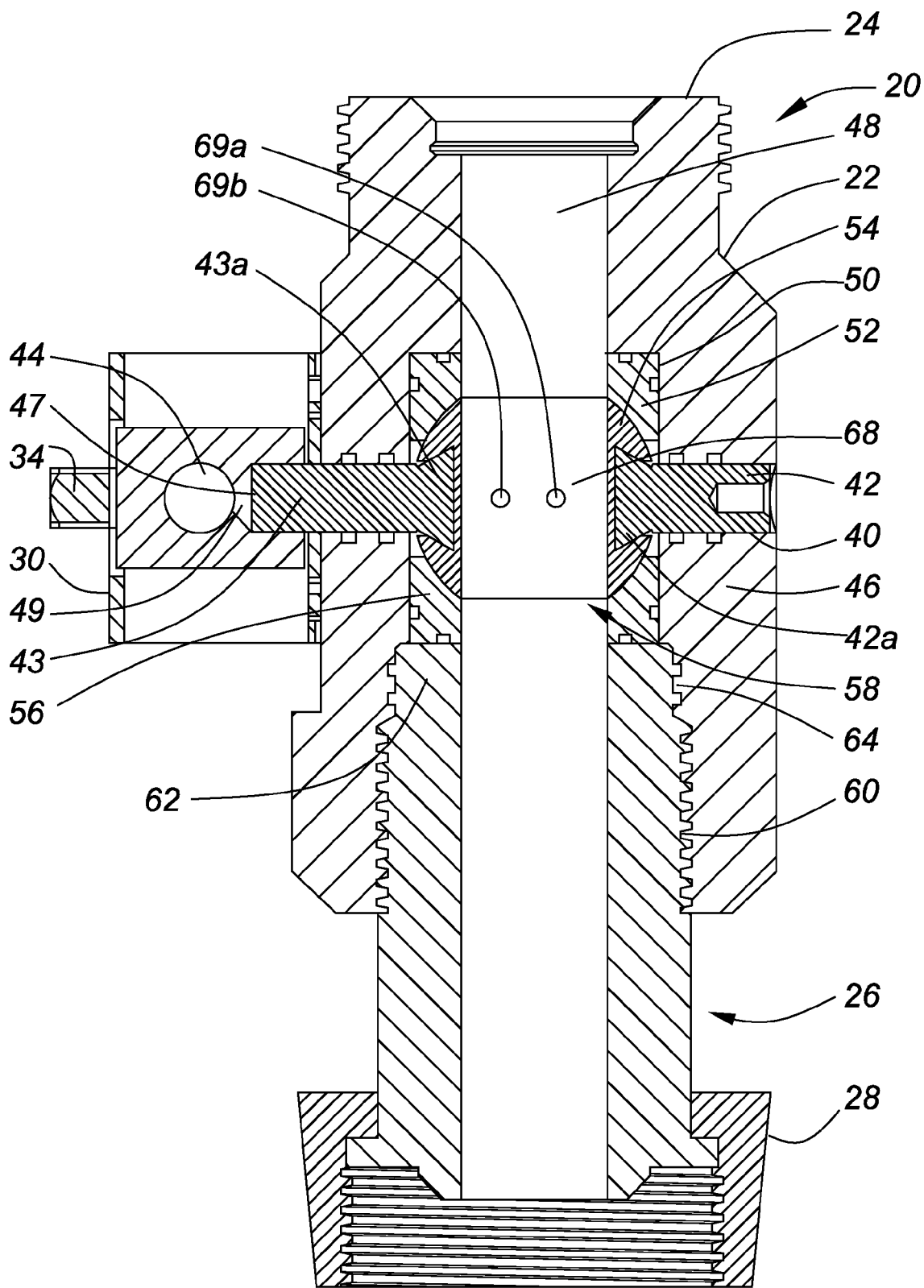
FIG. 7 is a schematic cross-sectional diagram, taken along lines 6-6 shown in FIG. 2, of the ball drop module in a ball released position.

The retainer ball 54 is supported by the lower ball seat and the upper ball seat 52 and is rotated from the ball retention position to the ball released position by a retainer ball stem 43. The retainer ball stem 43 and the pressure balance stem 42 are T-shaped with respective inner ends 42a, 43a that are rectangular in end view and have a truncated pyramid shape in side view, as can be seen in FIG. 7. The inner ends 43a, 42a of the retainer ball stem 43 and the pressure balance stem 42 are received in respective grooves 55 machined in opposed sides of the retainer ball 54. The respective grooves 55 have inwardly inclined planar side edges as seen in FIG. 7. This permits the retainer ball 54 to float between the lower ball seat 56 and the upper ball seat 52.

The retainer ball stem 43 is connected to the actuator stem 34 by a hex head on an outer end 47 of the retainer ball stem 43. This decouples the retainer ball stem 43 from the actuator stem 34 so that the retainer ball stem 43 can move in a radial direction with respect to the central passage 48 in response to pressure changes in the central passage 48 without stressing the mounting bracket 30 or the actuator stem 34. The outer end 47 of the retainer ball stem 43 has the same cross-sectional area as an outer end of the pressure balance stem 42. A pressure balance bore 49 in the actuator stem 34 exposes the outer end 47 of the retainer ball stem 43 to atmospheric pressure. This ensures that the retainer ball 54 is not exposed to any uneven outward force applied by the retainer ball stem 43 and the pressure balance stem 42. The retainer ball 54 therefore remains balanced and centered between the upper ball seat 52 and the lower ball seat 56 regardless of a frac fluid pressure in the central passage 48.

The retainer ball 54 has a ball release bore 68 with a diameter at least as large as the central passage 48. The retainer ball 54 also has through bores 69a-69d on opposite sides of the ball release bore 68. The through bores 69a-69d provide fluid communication between an interior of the central passage 48 in the tubular body 22 and the central passage 48 in the female component 26. This ensures that another module 20 or a purge valve mounted to a top of the module 20 is exposed to frac fluid pressure, and further ensures that the retainer ball 54 is free to rotate within the lower ball seat 56 and the upper ball seat 52 since it is pressure balanced on all sides.

FIG. 7 is the schematic cross-sectional diagram of the module 20 taken along lines 6-6 shown in FIG. 2 with the ball retainer mechanism 58 in the ball released position. In this position the ball retainer mechanism 58 has been rotated 90° by the actuator so that the ball release bore 68 in the retainer ball 54 is aligned with the central passage 48. In the ball released position, any ball(s) held above the retainer ball 54 are released and drop through the central passage 48. As will be explained below with reference to FIGS. 8 and 9, when the ball retainer mechanism 58 is rotated to the ball released position the ball retainer mechanism 58 is automatically locked in that position and cannot be moved without a manual reset.

Figure 8:
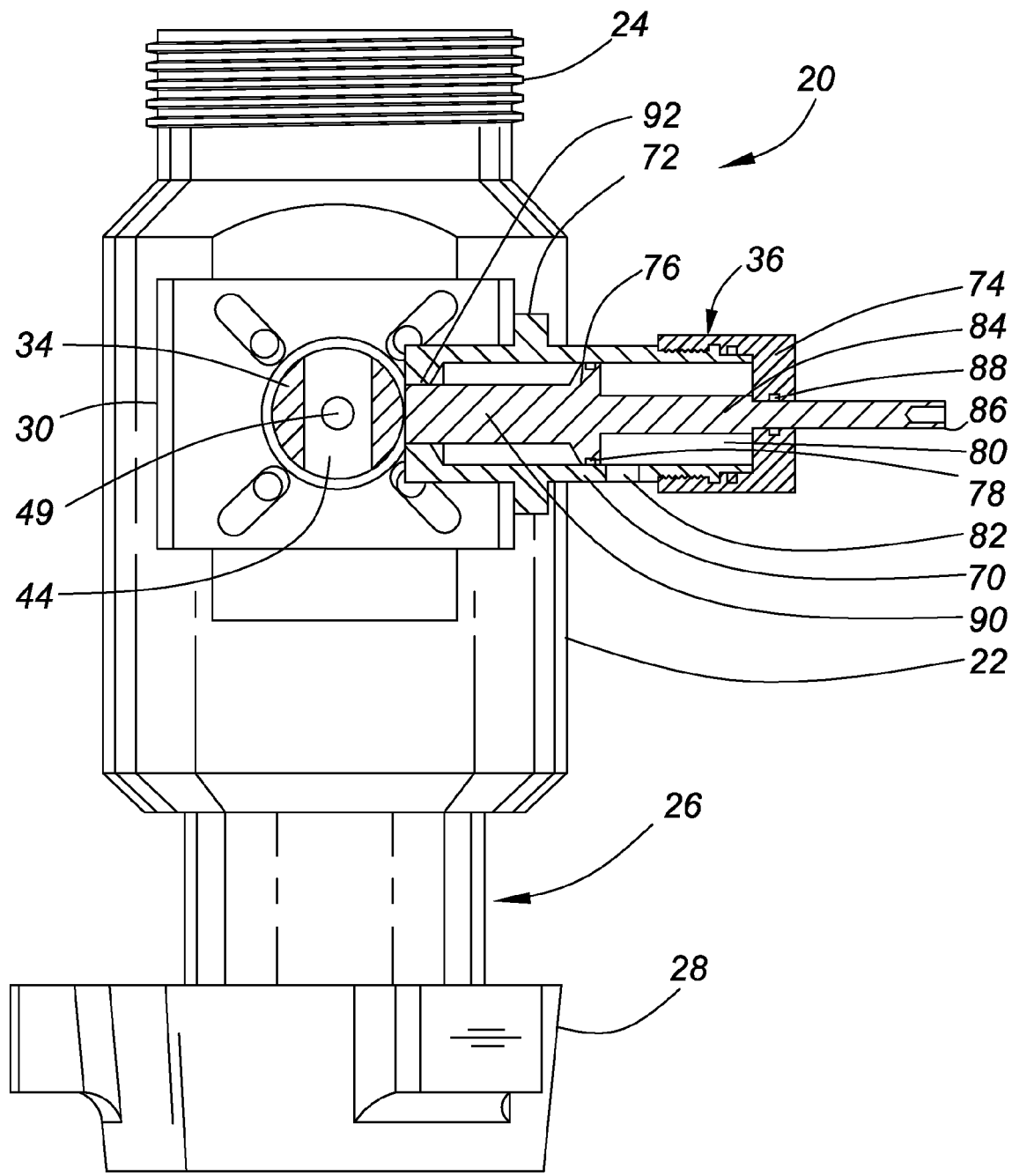
FIG. 8 is a schematic cross-sectional diagram, taken along lines 8-8 shown in FIG. 1, of the ball drop module in the ball retention position.

FIG. 8 is a schematic cross-sectional diagram, taken along lines 8-8 shown in FIG. 1, of the module 20 with the ball retainer mechanism 58 in the ball retention position shown in FIG. 6. The actuator stem lock mechanism 36 is shown in cross-section. In this embodiment, the actuator stem lock mechanism 36 is a fluid cylinder 70 having a flange 72 that receives the threaded fasteners 38 to connect the actuator stem lock mechanism 36 to the mounting bracket 30, as explained above with reference to FIG. 1. The fluid cylinder 70 has an end cap 74 that is threadedly secured to the fluid cylinder 70 in a manner well known in the art. A piston 76 has a fluid seal 78 that retains fluid (pneumatic or hydraulic) within a fluid chamber 80 of the fluid cylinder 70. A port 82 supports the connection of a fluid supply line (not shown) to the cylinder 70. A rod 84 connected to a fluid end of the piston 76 has a piston position indicator 86 that reciprocates through a fluid seal 88 in the end cap 74. The position indicator 86 provides a visual indication of the position of a lock bolt 90 connected to an opposite side of the piston 76. In operation the lock bolt 90 is constantly urged through a circular port 92 in the inner end of the cylinder 70 by fluid pressure in the fluid chamber 80.

FIG. 9 is a schematic cross-sectional diagram, taken along lines 8-8 shown in FIG. 1, of the module 20 with the ball retainer mechanism 58 in the ball released position shown in FIG. 7. When the actuator moves the ball retainer mechanism 58 to the ball released position, fluid pressure in the fluid chamber 80 of the cylinder 70 drives the lock bolt 90 through the lock bore 44 in the actuator stem 34, locking the actuator stem 34 and the ball retainer mechanism 58 in the ball released position. In this embodiment, a manual reset is required to return the ball retainer mechanism 58 to the ball retention position shown in FIG. 6. Although the actuator stem lock mechanism 36 is shown to be a pneumatic or hydraulic cylinder, it should be understood that an electric solenoid could also be used for the same purpose.

FIG. 10 is a schematic diagram of an exemplary configuration of a modular ball drop 100 in accordance with the invention. A plurality of modules 20a-20c is vertically stacked to accommodate a plurality of frac balls or groups of frac balls. Each module is preloaded with the number of balls required to be simultaneously dropped before the next module 20 is added to the vertical stack. Alternatively, the vertical stack is built and the ball retainer mechanism 58 of the respective modules 20 is manually moved to the ball retention position after the module 20 below it is loaded with the required number of frac balls. If the capacity of the central passage 48 above the retainer ball 54 is not large enough to accommodate the required balls, a pup joint (not shown) can be added between the modules 20 using appropriate adapter (s) well known in the art. As can be seen, the hammer nut 28b connects module 20b to module 20a, and hammer nut 28c connects module 20c to module 20b, etc. Each module 20a-20c is equipped with an actuator 102a-102c. The actuators 102a-102c can be any control mechanism, including a pneumatic actuator; a hydraulic actuator; a stepper motor; a hydraulic motor; or any other power source capable of reliably moving the ball retainer mechanism 58 from the ball retention position shown in FIG. 6 to the ball released position shown in FIG. 7.

A purge valve 104 is connected to a top of the modular ball drop 100 using a high pressure coupling or a high pressure adapter, each of which are known in the art. In one embodiment, the purge valve 104 is a remote controlled hydraulic valve. The purge valve is used to purge the modular ball drop 100 of air after the modular ball drop 100 is directly or indirectly connected to a frac head or a frac iron, for example.

FIG. 11 is a schematic diagram of an exemplary configuration of the modular ball drop 100 incorporated in an exemplary frac stack 200. This frac stack 200 is mounted to a wellhead 202. The frac stack 200 includes a cross-flow tee 204, a high pressure valve 206, an adapter 208, and a frac head 210 to which a plurality of frac irons (not shown) are connected in a manner well known in the art. An adapter 212, a Bowen union for example, is used to connect a ball drop wellhead control apparatus 214 to the top of the frac head 210, as described in Assignee's co-pending U.S. Pat. No. 9,010, 412 which issued Apr. 21, 2015. In this exemplary configuration, a ball drop or a ball injector 216 is mounted to a top of the ball drop wellhead control apparatus 214. The ball drop or ball injector 216 may be any one of the frac ball drops or frac ball injectors known in the art. The modular ball drop 100 is mounted to a side port of the ball drop wellhead control apparatus 214 using, for example, a frac iron tee 218. A frac iron 220 is connected to the frac iron tee 218. A high pressure valve (not shown) controls fluid flow through the frac iron 220 as described in Assignee's above-referenced U.S. Pat. No. 9,010,412, the specification of which is incorporated herein by reference.

As explained above, in use a ball or group of balls is dropped from a module 20 of the modular ball drop 100 at an appropriate time during a well stimulation procedure. Once the frac ball or group of frac balls is dropped by the modular ball drop 100, the module 20 that dropped the ball or group of balls is locked in the ball released position and cannot be returned to the ball retention position. In the configuration shown in FIG. 11, the modular ball drop 100 is used to drop the smallest balls required for a well stimulation operation, or to supplement small balls dropped by the ball drop or ball injector 216.

Although the modules 20 of the modular ball drop 100 have been described as having quick-disconnect threaded unions, it should be understood that the modules 20 could likewise be equipped with API flanges, Graylock® connectors, or any other type of high pressure connector known in the art.

The scope of this invention is therefore intended to be limited solely by the scope of the appended claims.

We claim:

1. A modular ball drop module, comprising:
a tubular body having a central passage:

a ball retainer mechanism comprising a retainer ball that is rotated by an actuator stem from a ball retention position in which the retainer ball retains at least one frac ball in the central passage to a ball released position in which the at least one frac ball is released from the central passage; and an actuator stem lock mechanism that automatically locks the retainer ball in the ball released position when the retainer ball is rotated from the ball retainer position to the ball released position, the actuator stem comprising a lock bolt that is constantly urged against a side of the actuator stem and is driven through a lock bore in the actuator stem when the retainer ball is moved from the ball retention position to the ball release position.

2. The modular ball drop module as claimed in claim 1 wherein the ball retainer mechanism comprises:
a retainer ball stem connected between a first side of the retainer ball and the actuator stem; and
a pressure balance stem connected to an opposite side of the retainer ball.

3. The modular ball drop module as claimed in claim 2 wherein the retainer ball further comprises a ball release bore that is at least as large as the central passage, and at least one through bore on opposite sides of the ball release bore that provides fluid communication through the retainer ball when the ball retainer mechanism is in the ball retention position.

4. The modular ball drop module as claimed in claim 3 wherein the retainer ball further comprises a slot in opposed sides thereof, the respective slots receiving respective ends of the retainer ball stem and the pressure balance stem.

5. The modular ball drop module as claimed in claim 1 wherein the actuator stem lock mechanism comprises a fluid cylinder that constantly urges the lock bolt against the actuator stem used to rotate the retainer ball from the ball retention position to the ball released position.

6. The modular ball drop module as claimed in claim 5 wherein the fluid cylinder further comprises a piston having a rod end with an indicator rod that extends through a cylinder cap of the fluid cylinder to provide a visual indication of a location of the piston within the fluid cylinder.

7. The modular ball drop module as claimed in claim 5 further comprising an actuator connected to the actuator stem to rotate the retainer ball from the ball retention position to the ball released position.

8. The modular ball drop module as claimed in claim 1 further comprising a lower ball seat and an upper ball seat that rotatably support the retainer ball.

9. The modular ball drop module as claimed in claim 8 wherein the upper ball seat and the lower ball seat are respectively received on opposite sides of the retainer ball in a ball retainer mechanism bore that is coaxial with the central passage.

10. A modular ball drop module, comprising:
a top end and a bottom end, the top end comprising a tubular body having a central passage, the top end adapted to be mounted to another ball drop module or a purge valve: and the bottom end connected to the top end and having a central passage of the same diameter and aligned with the central passage of the top end, the bottom end being adapted to be mounted to any one of: another ball drop module, a frac head and a frac iron:
a ball retainer mechanism housed by the tubular body and comprising a retainer ball that obstructs the central passage of the tubular body when the retainer ball is in a ball retention position, the retainer ball being rotated by an actuator stem from the ball retention position to a ball released position in which the central passage is unobstructed: and
an actuator stem lock mechanism that automatically locks the retainer ball in the ball released position when the retainer ball is rotated from the ball retainer position to the ball released position, the actuator stem lock mechanism comprising a lock bolt that is constantly urged against a side of the actuator stem and is driven through a lock bore in the actuator stem when the retainer ball is rotated from the ball retention position to the ball released position.

11. The modular ball drop module as claimed in claim 10 wherein the retainer ball comprises a ball release bore that is at least as large as the central passage, and at least one through bore on opposite sides of the ball release bore that provides fluid communication through the retainer ball when the retainer ball is in the ball retention position, the at least one through bore having a smaller internal diameter than an outer diameter of a smallest frac ball to be dropped by the modular ball drop.

12. The modular ball drop module as claimed in claim 11 wherein the retainer ball further comprises slots on opposite sides thereof, the respective slots having inwardly inclined planar side surfaces.

13. The modular ball drop module as claimed in claim 12 wherein one of the slots receives an inner end of a retainer ball stem and the other slot receives an inner end of a pressure balance stem.

14. The modular ball drop module as claimed in claim 10 further comprising a lower ball seat and an upper ball seat received in a ball retainer mechanism bore of the tubular body, the lower ball seat and the upper ball seat supporting the retainer ball for rotation from the ball retention position to the ball released position.

15. The modular ball drop module as claimed in claim 10 wherein the lock bolt is constantly urged by a fluid cylinder having a piston to which the lock bolt is connected.

16. A modular ball drop with at least two ball drop modules, the respective ball drop modules comprising:
a central passage that stores frac balls to be dropped by a retainer ball of a ball retainer mechanism of the ball drop module, the retainer ball obstructing the central passage in a ball retention position and opens the passage in a ball released position to let the frac balls drop through the central passage of the ball drop module;
an actuator stem connected to the ball retainer mechanism, the actuator stem being adapted to rotate the retainer ball from the ball retention position to the ball released position; and
an actuator stem lock mechanism that is constantly urged against a side of an actuator stem that rotates the retainer ball to lock the actuator stem in the ball released position, the actuator stem lock mechanism comprising a fluid cylinder having a piston and a lock bolt attached to the piston, whereby fluid pressure in the cylinder constantly urges the lock bolt against the side of the actuator stem and the lock bolt is driven through a lock bore in the actuator stem when the actuator stem is rotated to move the retainer ball from the ball retention position to the ball release position.

17. The modular ball drop module as claimed in claim 16 further comprising a lower ball seat and an upper ball seat, the lower ball seat and the upper ball seat supporting the retainer ball for rotation when the actuator stem rotates the retainer ball from the ball retention position to the ball released position.

* * * * *